United States Patent
Mao

(10) Patent No.: US 9,525,722 B2
(45) Date of Patent: Dec. 20, 2016

(54) OBTAINING MOBILE CONTACT INFORMATION

(71) Applicants: Beijing Lenovo Software Ltd., Haidian District, Beijing (CN); Lenovo (Beijing) Co., Ltd., Haidian District, Beijing (CN)

(72) Inventor: Daishan Mao, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 350 days.

(21) Appl. No.: 14/104,512

(22) Filed: Dec. 12, 2013

(65) Prior Publication Data

US 2014/0171042 A1    Jun. 19, 2014

(30) Foreign Application Priority Data

Dec. 13, 2012    (CN) .......................... 2012 1 0540112

(51) Int. Cl.
*G06F 17/00* (2006.01)
*H04L 29/08* (2006.01)
(Continued)

(52) U.S. Cl.
CPC .............. *H04L 67/10* (2013.01); *G06F 3/0482* (2013.01); *H04M 1/274558* (2013.01); *H04M 1/274516* (2013.01); *H04M 1/7253* (2013.01)

(58) Field of Classification Search
CPC .................................................. G06F 3/0482
See application file for complete search history.

(56) References Cited

U.S. PATENT DOCUMENTS 7,453,993 B2 * 11/2008 Watts ................ H04L 29/06027
                                                                370/261
7,620,387 B2 * 11/2009 Rybak .................... H04L 51/38
                                                                455/403
(Continued)

FOREIGN PATENT DOCUMENTS

CN      102378159      3/2012
EP      2 458 896      5/2012

OTHER PUBLICATIONS

Chang, "iCloud: Syncing," Macworld, Oct. 12, 2011, p. 1-13, available at http://www.macworld.com/article/1162953/web-apps/icloud-syncing.html.*
(Continued)

*Primary Examiner* — Amelia Tapp
(74) *Attorney, Agent, or Firm* — Brinks Gilson & Lione; G. Peter Nichols

(57) ABSTRACT

The present invention provides an information processing method applied to a first electronic device having a communication function, able to be connected to a second electronic device, and including a display unit. The method includes obtaining first character string information used for looking up first contact information corresponding to a first contact person; transmitting the first character string information to the second electronic device; receiving N pieces of contact information including the first contact information which are obtained by the second electronic device based on the first character string information, N being an integer equal to or larger than one; and displaying the N pieces of contact information on the display unit, so as to determine the first contact information from among the N pieces of contact information in response to a selection operation from a user when detecting the selection operation.

13 Claims, 5 Drawing Sheets

(51) Int. Cl.
*G06F 3/0482* (2013.01)
*H04M 1/2745* (2006.01)
*H04M 1/725* (2006.01)

(56) References Cited

U.S. PATENT DOCUMENTS 8,463,246 B2 * 6/2013 Gueron ............... H04W 8/18
455/414.1
8,554,781 B2 * 10/2013 Teicher ............... G06F 3/01
707/758

OTHER PUBLICATIONS

Microsoft Support, "How to use the vCard feature in Outlook," Revision 4.0, May 20, 2010, p. 1-6, available at https://support.microsoft.com/en-us/kb/290840.*
Tofel, Gigaom, "How to Use the Cloud to Move Contacts Between Phones," Apr. 8, 2011, p. 1-6, retrieved from Google Cache.*
Trevor et al., "Contextual Contact Retrieval" IUI'04, Jan. 13-16, 2004, Madeira, Funchal, Portugal, p. 337-339.*
CN 201210540112.7 First Office Action dated May 4, 2015 (13 pages including English translation).
Second Office Action dated Jan. 4, 2016 out of Chinese priority Application No. 201210540112.7 (15 pages including English translation).

* cited by examiner

| Addressee: | XX□□□□ |
| --- | --- |
| | Maoyi123@163.com |
| Addresser | Zhangguirong@163.com |
| Subject Matter | |

FIG. 3

OBTAINING MOBILE CONTACT INFORMATION

This application claims priority to Chinese patent application No. 201210540112.7 filed on Dec. 13, 2012, the entire contents of which are incorporated herein by reference.

BACKGROUND

The present invention relates to the field of electronics, and in particular, to an information processing method and apparatus.

With the development of communications, communications made through mobile phones, computers become increasingly convenient, but no matter in mobile phone communications or in computer communications, information on a contact person, such as a mobile phone number, an instant messaging number, or an email address, must be known.

In the prior art, when a mobile phone is used to make a call or send a short message, a phone number can only be entered directly, or be looked up in contact information or communication recording stored in the mobile phone; likewise, when a computer or a mobile phone is used to send an email or an instant message, an email address can only be entered directly, or be looked up in contacts of the mobile phone or the computer. Especially for some contact information such as telephone numbers, emails of public service, or the like, if the needed contact information is not stored in the mobile phone or the computer being used, and the contact information is not kept in mind either, we all need to inquire through other cumbersome ways, such as inquiring through 114, or searching on Internet by the user.

However, in the process of implementing the technical solutions of embodiments of the present application, the inventor of the present application has found that the above technique has at least the following technical problems:

Since in the prior art, a mobile phone or a computer can look up and obtain the needed contact information only from the contact information that has already been stored in the mobile phone or the computer, there is a technical problem of being impossible to, based on character string information input by a user, obtain contact information corresponding to the character string information when the needed contact information fails to be stored in the mobile phone or the computer.

Furthermore, since in the prior art, when the needed contact information fails to be stored in the mobile phone or the computer, it is impossible to, based on character string information input by a user, obtain contact information corresponding to the character string information, there is a technical problem that the mobile phone or the computer cannot obtain the contact information needed by the user directly from other electronic devices.

Since in the prior art, when the needed contact information fails to be stored in the mobile phone or the computer, it is impossible to, based on character string information input by a user, obtain contact information corresponding to the character string information, there is a technical problem that the mobile phone or the computer can output contact information corresponding to the character string information only when the contact information input by the user is detected by pertained devices of the mobile phone or the computer.

SUMMARY

Embodiments of the present application provide an information processing method and apparatus, for solving the technical problem that when the needed contact information fails to be stored in the mobile phone or the computer, it is impossible to, based on character string information input by a user, obtain contact information corresponding to the character string information in the prior art.

In an aspect, the present invention, through an embodiment thereof, provides an information processing method applied to a first electronic device having a communication function, able to be connected to a second electronic device, and including a display unit, the method including:

obtaining first character string information used for looking up first contact information corresponding to a first contact person;

transmitting the first character string information to the second electronic device;

receiving N pieces of contact information including the first contact information which are obtained by the second electronic device based on the first character string information, N being an integer equal to or larger than one; and displaying the N pieces of contact information on the display unit, so as to determine the first contact information from among the N pieces of contact information in response to a selection operation from a user when detecting the selection operation.

Preferably, prior to transmitting the first character string information to the second electronic device, the method further includes:

looking up whether there is the first contact information in the first electronic device based on the first character string information; and when there is no first contact information in the first electronic device, executing a step of transmitting the first character string information to the second electronic device.

Preferably, transmitting the first character string information to the second electronic device specifically is:

when detecting a transmission operation from the user, generating a transmission instruction in response to the transmission operation; and executing the transmission instruction to transmit the first character string information to the second electronic device.

Preferably, the first character string information specifically is:

name character string information corresponding to a name of the first contact person; or function character string information corresponding to a function of the first contact person.

Preferably, transmitting the first character string information to the second electronic device specifically is:

transmitting the first character string information to a cloud server in a network connected to the first electronic device; and/or transmitting the first character string information to a handheld electronic device directly connected to the first electronic device in a wireless manner or a wired manner.

Preferably, receiving N pieces of contact information including the first contact information which are obtained by the second electronic device based on the first character string information specifically is:

receiving mobile phone number information including a first mobile phone number which are obtained by the second electronic device based on the first character string information; and/or receiving instant messaging number information including a first instant messaging number which are obtained by the second electronic device based on the first character string information; and/or receiving email address information including a first email address which are obtained by the second electronic device based on the first character string information.

Preferably, after displaying the N pieces of contact information on the display unit, so as to determine the first contact information from among the N pieces of contact information in response to a selection operation from a user when detecting the selection operation, the method further includes:

when detecting that the user performs a dialing operation on the first mobile phone number, directly executing the dialing operation corresponding to the mobile phone number information in response to the dialing operation; or when detecting that the user performs a short message sending operation on the first mobile phone number, directly executing the short message sending operation corresponding to the mobile phone number information in response to the short message sending operation; or when detecting that the user performs an instant information sending operation on the first instant messaging number, directly executing the instant information sending operation corresponding to the instant messaging number information in response to the instant information sending operation; or when detecting that the user performs an email sending operation on the first email address, directly executing the email sending operation corresponding to the email address in response to the email sending operation.

In another aspect, the present invention, through another embodiment thereof, provides an apparatus applied to a first electronic device having a communication function, able to be connected to a second electronic device, and including a display unit, the apparatus including:

an obtaining unit for obtaining first character string information used for looking up first contact information corresponding to a first contact person;

a first transmitting unit for transmitting the first character string information to the second electronic device;

a receiving unit for receiving N pieces of contact information including the first contact information which are obtained by the second electronic device based on the first character string information, N being an integer equal to or larger than one; and a displaying unit for displaying the N pieces of contact information on the display unit, so as to determine the first contact information from among the N pieces of contact information in response to a selection operation from a user when detecting the selection operation.

Preferably, the apparatus further includes:

a look-up unit for looking up whether there is the first contact information in the first electronic device based on the first character string information.

Preferably, the first transmitting unit specifically includes:

a generating sub-unit for, when detecting a transmission operation from the user, generating a transmission instruction in response to the transmission operation; and a transmitting sub-unit for executing the transmission instruction to transmit the first character string information to the second electronic device.

Preferably, the first transmitting unit is specifically for:

transmitting the first character string information to a cloud server in a network connected to the first electronic device; and/or transmitting the first character string information to a handheld electronic device directly connected to the first electronic device in a wireless manner or a wired manner.

Preferably, the receiving unit is specifically for:

receiving mobile phone number information including a first mobile phone number which are obtained by the second electronic device based on the first character string information; and/or receiving instant messaging number information including a first instant messaging number which are obtained by the second electronic device based on the first character string information; and/or receiving email address information including a first email address which are obtained by the second electronic device based on the first character string information.

Preferably, the apparatus further includes:

a first executing unit for, when detecting that the user performs a dialing operation on the first mobile phone number, directly executing the dialing operation corresponding to the mobile phone number information in response to the dialing operation; or a second executing unit for, when detecting that the user performs a short message sending operation on the first mobile phone number, directly executing the short message sending operation corresponding to the mobile phone number information in response to the short message sending operation; or a third executing unit for, when detecting that the user performs an instant information sending operation on the first instant messaging number, directly executing the instant information sending operation corresponding to the instant messaging number information in response to the instant information sending operation; or a fourth executing unit for, when detecting that the user performs an email sending operation on the first email address, directly executing the email sending operation corresponding to the email address in response to the email sending operation.

One or more of the technical solutions provided in the embodiments of the present application have at least the following technical effects or advantages:

1. Since the technical measures of transmitting, by a first electronic device (e.g., a mobile phone, a computer), character string information used for looking up contact information to which a contact person corresponds, looking up, by a second electronic device, contact information based on the character string information, and thereafter receiving N pieces of contact information including the first contact information which are obtained by the second electronic device based on the first character string information are adopted, the technical problem that when the needed contact information fails to be stored in the mobile phone or the computer, it is impossible to, based on character string information input by a user, obtain contact information corresponding to the character string information in the prior art is solved efficiently, and thereby the technical effect that the first electronic device can, based on character string information input by a user, obtain contact information corresponding to the character string information from a second electronic device that is connected to the first electronic device is achieved.

2. Since the first electronic device can, based on character string information input by a user, obtain contact information corresponding to the character string information from a second electronic device that is connected to the first electronic device, technical problem that the mobile phone or the computer cannot obtain the contact information needed by the user directly from other electronic devices in the prior art is solved efficiently, and thereby the technical effect that, when there is no contact information corresponding to the character string information in the first electronic device, contact information corresponding to the character string information can be obtained from other electronic devices rapidly is achieved, which improves the degree of user experience.

3. Since the technical measures of, when detecting that the user executes an application operation on the contact information (e.g., dialing, sending a short message, an email, or instant information), directly executing the operation of dialing, sending a short message, an email, or instant information corresponding to the contact information in response to the application operation are adopted, the technical problem that the mobile phone or the computer can output contact information corresponding to the character string information only when the contact information input by the user is detected by devices pertained to the mobile phone or the computer is solved effectively, and thereby the technical effect of directly responding to the user's application operation based on the contact information corresponding to the character string information, which reduces the degree of complication of user operations.

BRIEF DESCRIPTION OF THE DRAWINGS

FIG. 3 is an effect diagram after step S103 is executed at the time of sending an email in an embodiment of the present application;

DETAILED DESCRIPTION

Figure 1:
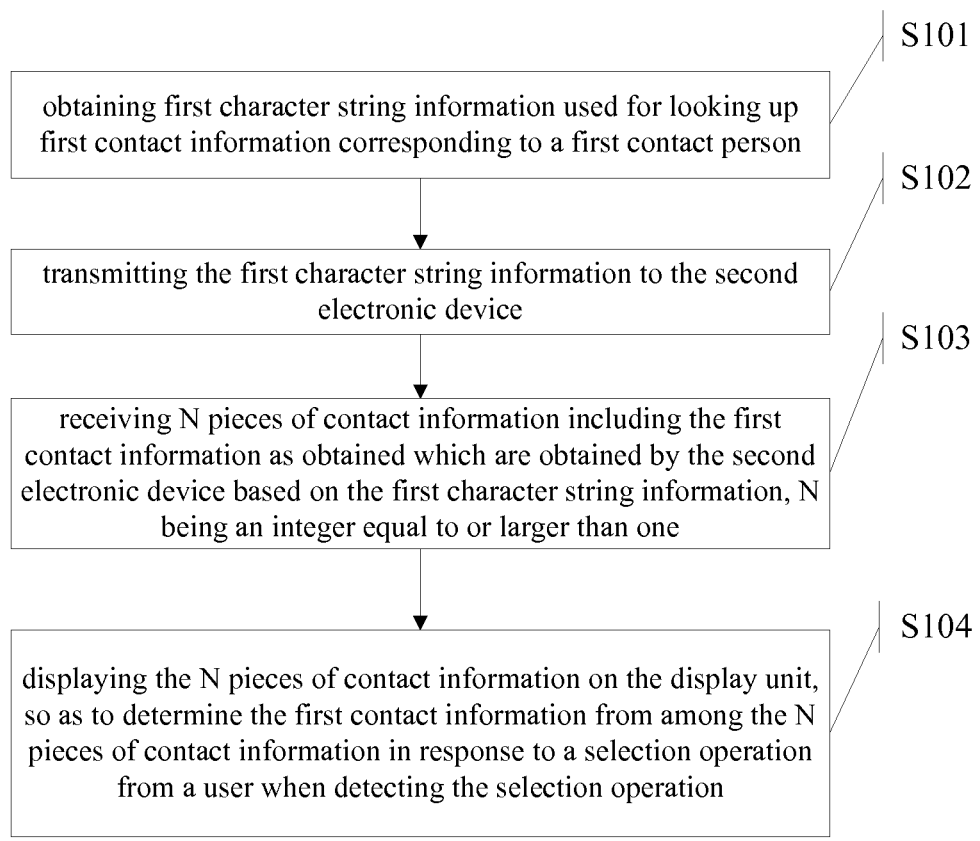
FIG. 1 is a flowchart of the information processing method in an embodiment of the present application.

Embodiments of the present application provide an information processing method and apparatus, for solving the technical problem that when the needed contact information fails to be stored in the mobile phone or the computer, it is impossible to, based on character string information input by a user, obtain contact information corresponding to the character string information in the prior art.

In order to solve the above problem, the technical solutions in the embodiments of the present application have the general concept as follows:

A first electronic device can be connected to a second electronic device, and obtain first character string information used for looking up first contact information corresponding to a first contact person; the first character string information is transmitted to the second electronic device; N pieces of contact information including the first contact information obtained by the second electronic device based on the first string information are received, N being an integer equal to or larger than one; and the N pieces of contact information are displayed on the display unit, so as to determine the first contact information from among the N pieces of contact information in response to a selection operation from a user when detecting the selection operation.

After obtaining the first character string information, the aforesaid first electronic device transmits the first character string information to the second electronic device, so that the second electronic device looks up contact information corresponding to the first character string information, and after the second electronic device looks up and obtains N pieces of contact information corresponding to the first character string information and including the first contact information, it transmits the same to the first electronic device, which is enabled to receive the N pieces of contact information corresponding to the first character string information and including the first contact information, in this way, the first electronic device can obtain the needed first contact information directly through the second electronic device, without requiring the user to look up through other cumbersome ways, therefore, the technical problem that, when the needed contact information fails to be stored in the mobile phone or the computer, it is impossible to, based on character string information input by a user, obtain contact information corresponding to the character string information in the prior art is solved, and thereby the technical effect that the first electronic device can, based on character string information input by a user, obtain contact information corresponding to the character string information from a second electronic device that is connected to the first electronic device is achieved.

To better understand the above technical solutions, the above technical solutions will be described in detail in conjunction with the accompanying drawings and the specific implementing modes hereinafter.

The present invention, through an embodiment thereof, provides an information processing method, referring to FIG. 1, FIG. 1 is a flowchart of the information processing method in an embodiment of the present application, the method is applied to a first electronic device having a communication function and able to be connected to a second electronic device, the first electronic device may specifically be a mobile phone, a computer, etc.

As shown in FIG. 1, the method includes:

S101: obtaining first character string information used for looking up first contact information corresponding to a first contact person.

Specifically, the obtained first character string information may specifically be name character string information corresponding to a name of the first contact person, or function character string information corresponding to a function of the first contact person. For example, when contact information of ordering a takeout is needed, the character string information may be name character string information "hao you duo" or "hyd" to which the name "好又多" corresponds, or may also be function character string information "wai mai" or "wm" to which the function "takeout" corresponds.

In a specific implementing process, the corresponding information input by an input operation of the user is detected so as to obtain the first character string information used for looking up the first contact information corresponding to a first contact person.

Specifically, there are many implementation modes of obtaining the first character string information in the implementing process, the specific implementation modes will be illustrated below, but the present application is not limited thereto.

For example, in a first embodiment, the mobile phone obtains the first character string information corresponding to a first contact person on an interface of entering phone numbers, for instance, the user needs to find the contact phone number of "You Jia Express (尤佳快递)", then the first character string information obtained based on the dialing interface is "9553", specifically, the keys to which the character string "yjkd", i.e., initials of the Chinese pronunciation "you jia kuai di" of "You Jia Express", corresponds.

In a second embodiment, the mobile phone or the computer obtains the first character string information corresponding to a first contact person in a column of addressee on an interface of sending an email, for example, the user needs to look up an email address of "XX University Graduate Admissions Office", then the first character string information obtained based on the interface of sending an email is "XX da xue yan zhao ban" or "XXdxyzb".

In a third embodiment, the mobile phone or the computer obtains the first character string information corresponding to a first contact person on an interface of instant messaging, for example, the user needs to look up the instant messaging number of "XX company sales manager", then the first character string information obtained based on the interface of instant messaging may be "XX gong si xiao shou bu men jing li".

S102: transmitting the first character string information to the second electronic device.

In a specific implementing process, no matter the first character string information used for looking up the first contact information corresponding to a first contact person is obtained by adopting the implementing mode in which embodiment in step S101, step S102 can be all executed based on the obtained first character string information.

In a specific implementation process, the second electronic device may specifically be a cloud server, and may also specifically be a handheld electronic device connected to the first electronic device in a wireless manner or a wired manner, based on the type of the second electronic device, the specific implementation process is:

transmitting the first character string information to a cloud server in a network connected to the first electronic device; and/or transmitting the first character string information to a handheld electronic device directly connected to the first electronic device in a wireless manner or a wired manner.

To be specific, for example, the second electronic device is a cloud server, then, after transmitting the first character string information, the cloud server looks up and obtains the first contact information in a network with an initial matching mode, or a phonetic matching mode, or a Chinese character matching mode, as for which matching manner is adopted, the present application makes no limitation thereto.

Another example, the second electronic device is a handheld electronic device and connected to the first electronic device in a wireless manner or a wired manner such as Bluetooth, WIFI etc., the first contact information is looked up in the handheld electronic device with an initial matching mode, or a phonetic matching mode, or a Chinese character matching mode. In a specific implementation process, the first character string information can be transmitted to multiple second electronic devices simultaneously, so as to increase the probability of obtaining the first contact information.

In a specific implementation process, no matter what type of electronic device the second electronic device is, the following implementing modes are all possible:

First implementing mode: transmitting the first character string information to the second electronic device directly. In this implementing mode, the first contact information corresponding to the first character string will be looked up in the first electronic device, and meanwhile, the first character string information is transmitted to the second electronic device, so as to look up the first contact information corresponding to the first character string in the first electronic device as well as the second electronic device simultaneously, and thereby obtain the more accurate first contact information corresponding to the first character string information. For example, a user needs the phone number of ordering takeout from "hao you duo (好又多)", then, if the input first character string information is "493", English character strings corresponding to "493" specifically are "hyd", "gxe", and so on, then the result of the lookup may probably include "hao you duo (好又多)", "hao you duo" (好友多) and so on, although there is the contact information corresponding to the first character string information in the first electronic device, it is not the contact information that the user needs, so the implementing mode can obtain the needed contact information in the second electronic device: the phone number of ordering takeout from "hao you duo (好又多)".

Second Implementing mode: looking up whether there is the first contact information in the first electronic device based on the first character string information; if there is no the first character string information in the first electronic device, executing step S102: transmitting the first character string information to the second electronic device.

In this implementing mode, after obtaining the first character string information, first a lookup is made in the first electronic device, step S102 is not executed if there is the first contact information corresponding to the first character string in the electronic device, step S102 is executed when there is no first contact information corresponding to the first character string in the first electronic device. This implementing mode can quickly obtain the first contact information corresponding to the first character string, because a connection and communication process with the second electronic device would be unnecessary when the first contact information can be obtained from the first electronic device.

Third implementing mode: when detecting a transmission operation from the user, generating a transmission instruction in response to the transmission operation; and executing the transmission instruction to transmit the first character string information to the second electronic device In this implementing mode, whether step S102 is to be executed is implemented according to the operation of the user, when the user needs to obtain the first contact information in the second electronic device, the first character string information is transmitted to the second electronic device.

After step S102, step S103 is executed in succession, that is, receiving N pieces of contact information including the first contact information which are obtained by the second electronic device based on the first character string information, N being an integer equal to or larger than one.

In a specific implementation process, step S103 may specifically have the following several implementing modes:

receiving mobile phone number information including a first mobile phone number which are obtained by the second electronic device based on the first character string information; and/or receiving instant messaging number information including a first instant messaging number which are obtained by the second electronic device based on the first character string information; and/or receiving email address information including a first email address which are obtained by the second electronic device based on the first character string information.

Figure 2:
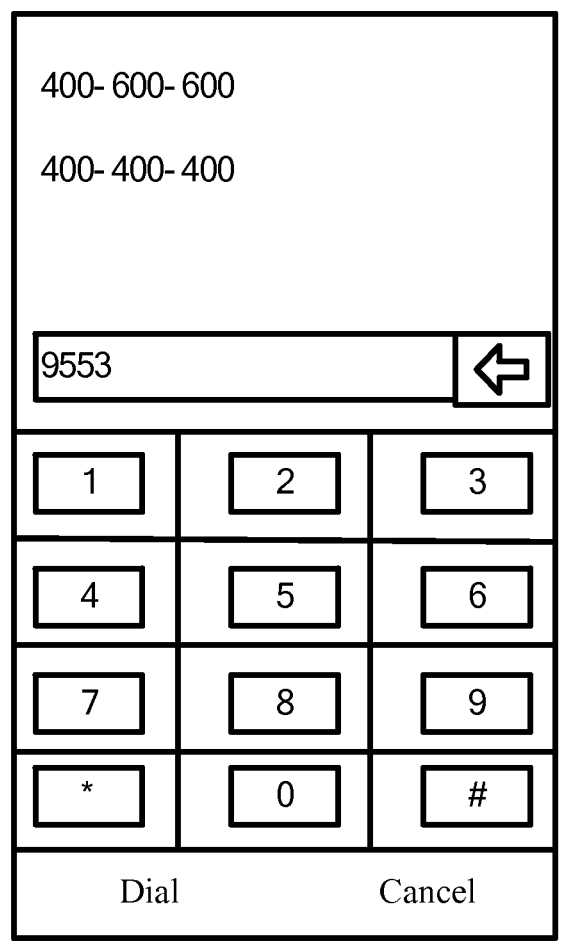
FIG. 2 is an effect diagram after step S103 is executed at the time of dialing by the mobile phone in an embodiment of the present application.

To be specific, if the first electronic device is a mobile phone, the user needs to find the number information on "Youjia (尤佳) Express" through an dialing interface, then the implementing mode based on the dialing by the mobile phone is as shown in FIG. 2, which specifically is, the user inputs "9553" on the dialing interface, with respect to the input "9553", the mobile phone receives N pieces of number information that matches the first character string information corresponding to the keys "9553", since the implementing mode based on the interface of sending a short message of the mobile phone is similar to the implementing mode based on the interface of dialing, the present application makes no more repeated description herein. And if the first electronic device is a computer, correspondingly, the email address information is received, the implementing mode based on the interface of sending an email is as shown in FIG. 3, and the corresponding email address is obtained through the first character string information of "XX Company HR Department" input by the user. In a specific implementation process, the principle of the implementing mode of obtaining the instant messaging number from the second electronic device is the same as that of obtaining the email address information from the second device, the present application makes no more repeated description herein, those skilled in the art can implement obtaining the instant messaging number from the second electronic device based on the same principle.

In a specific implementation process, step S104, i.e., displaying the N pieces of contact information on the display unit, so as to determine the first contact information from among the N pieces of contact information in response to a selection operation from a user when detecting the selection operation, is executed after step S103.

To be specific, after receiving N pieces of contact information looked up and obtained by the second electronic device, these pieces of contact information that match the first character string information are all displayed on the display unit of the first electronic device, as shown in FIG. 2, when detecting that the user selects the needed first contact information from among the displayed N pieces of contact information, the first contact information is determined in response to the selection operation.

In a specific implementation process, after determining the first contact information in step S104, the present invention may further includes the following steps according to the specific implementing modes:

In a first case: when detecting that the user performs a dialing operation on the first mobile phone number, directly executing the dialing operation corresponding to the mobile phone number information in response to the dialing operation; or In a second case: when detecting that the user performs a short message sending operation on the first mobile phone number, directly executing the short message sending operation corresponding to the mobile phone number information in response to the short message sending operation; or In a third case: when detecting that the user performs an instant information sending operation on the first instant messaging number, directly executing the instant information sending operation corresponding to the instant messaging number information in response to the instant information sending operation; or In a fourth case: when detecting that the user performs an email sending operation on the first email address, directly executing the email sending operation corresponding to the email address in response to the email sending operation.

To be specific, based on different implementing modes, the obtained N pieces of contact information are also different. The received N pieces of contact information obtained by the second electronic device and including the first contact information may specifically be mobile phone number information, or email address information, or instant messaging number information etc., but no matter in what kind of implementing modes, all of them can be displayed directly on the first electronic device, and the first contact information that the user needs can be determined from among the displayed N pieces of contact information according to the selection operation of the user, and with respect to this first contract information, an application operation of dialing, sending a short message, sending an email, or the like can be executed directly on it, it is not necessary to implement dialing, sending a short message, or the like through other steps, which thereby improves the degree of user experience.

If a user A needs to order from "hao you duo (好又多)", but the ordering number of "hao you duo" fails to be stored in the mobile phone A of the user A, and the userA does not know the ordering number of "hao you duo" in mind either.

Figure 4:
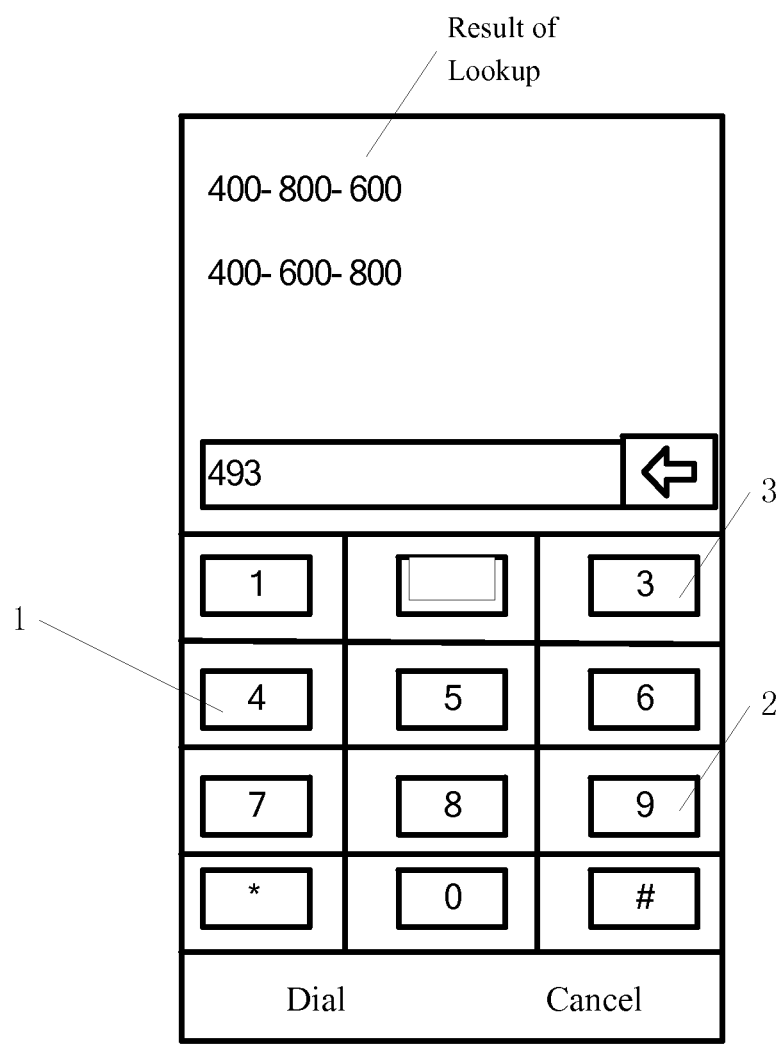
FIG. 4 is a schematic diagram of flows of a specific implementation to which the information processing method correspond at the time of dialing by the mobile phone in an embodiment of the present application.

The implementing mode of the present application will be described in detail hereinafter with a preferred embodiment of looking up the ordering contact information of "hao you duo" on the mobile phone A and a cloud server simultaneously by referring to FIG. 4. It should be noted that this embodiment is only for interpreting the present application, not intended to limit the present application.

First, the userA can make the mobile phone store the ordering number of "hao you duo" in advance, when entering the keys "493" corresponding to the initials "hyd" of the name "hao you duo", then the mobile phone A looks up in a list of contacts stored in the mobile phone A, assuming that the contact information corresponding to "493" looked up and obtained is "hao you duo (好友多), 400-800-600", meanwhile, the mobile phone sends "493" to the cloud server connected to the mobile phone, the cloud server converts the character string "493" into the corresponding English character string "hyd", "gxe" etc., and thereafter, contact information that matches the converted English character string is looked up on a network based on the cloud server. Assuming that the contact information that matches which are obtained through the lookup is "hao you duo, 400-800-600" (好友多) and "hao you duo, 400-600-800" (好又多), the obtained contact information is transmitted to the mobile phone A, the mobile phone A receives the contact information transmitted by the cloud server, and thereafter the contact information obtained based on the mobile phone A and the contact information obtained based on the cloud server are synthetically displayed on the mobile phone A, in a manner that the contact information looked up and obtained in the mobile phone is displayed first and the contact information looked up and obtained in the cloud server is displayed successively, the displaying result is as shown in FIG. 4. Thereafter, the user can directly select the contact information "hao you duo, 400-600-800" to which "hao you duo" corresponds, press keys, then the mobile phone can dial the number "400-600-800".

Figure 5:
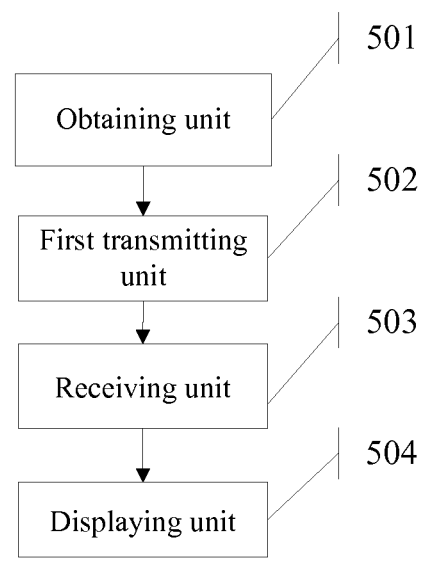
FIG. 5 is a schematic diagram of structure of the apparatus in an embodiment of the present application.

Based on the same inventive concept, the present invention, through another embodiment thereof, provides an apparatus, referring to FIG. 5, FIG. 5 is a schematic diagram of structure of the apparatus in an embodiment of the present application, the apparatus is applied to a first electronic device having a communication function and able to be connected to a second electronic device.

As shown in FIG. 5, the apparatus includes the following architecture:

an obtaining unit 501 for obtaining first character string information used for looking up first contact information corresponding to a first contact person;

a first transmitting unit 502 for transmitting the first character string information to the second electronic device;

a receiving unit 503 for receiving N pieces of contact information including the first contact information which are obtained by the second electronic device based on the first character string information, N being an integer equal to or larger than one; and a displaying unit 504 for displaying the N pieces of contact information on the display unit, so as to determine the first contact information from among the N pieces of contact information in response to a selection operation from a user when detecting the selection operation.

Furthermore, in a specific implementation process, the apparatus further includes:

a look-up unit for looking up whether there is the first contact information in the first electronic device based on the first character string information.

Furthermore, the first transmitting unit particularly includes:

a generating sub-unit for, when detecting a transmission operation from the user, generating a transmission instruction in response to the transmission operation; and a transmitting sub-unit for executing the transmission instruction to transmit the first character string information to the second electronic device.

Furthermore, in the specific implementation process, the first transmitting unit is specifically for:

transmitting the first character string information to a cloud server in a network connected to the first electronic device; and/or transmitting the first character string information to a handheld electronic device directly connected to the first electronic device in a wireless manner or a wired manner.

In a specific implementation process, the receiving unit is specifically for:

receiving mobile phone number information including a first mobile phone number which are obtained by the second electronic device based on the first character string information; and/or receiving instant messaging number information including a first instant messaging number which are obtained by the second electronic device based on the first character string information; and/or receiving email address information including a first email address which are obtained by the second electronic device based on the first character string information.

Furthermore, in a specific implementation process, the apparatus further includes:

a first executing unit for, when detecting that the user performs a dialing operation on the first mobile phone number, directly executing the dialing operation corresponding to the mobile phone number information in response to the dialing operation; or a second executing unit for, when detecting that the user performs a short message sending operation on the first mobile phone number, directly executing the short message sending operation corresponding to the mobile phone number information in response to the short message sending operation; or a third executing unit for, when detecting that the user performs an instant information sending operation on the first instant messaging number, directly executing the instant information sending operation corresponding to the instant messaging number information in response to the instant information sending operation; or a fourth executing unit for, when detecting that the user performs an email sending operation on the first email address, directly executing the email sending operation corresponding to the email address in response to the email sending operation.

One or more of the technical solutions provided in the embodiments of the present application have at least the following technical effects or advantages:

1. Since the technical measures of transmitting, by a first electronic device (e.g., a mobile phone, a computer), character string information used for looking up contact information to which a contact person corresponds, looking up, by a second electronic device, contact information based on the character string information, and thereafter receiving N pieces of contact information including the first contact information which are obtained by the second electronic device based on the first character string information are adopted, the technical problem that when the needed contact information fails to be stored in the mobile phone or the computer, it is impossible to, based on character string information input by a user, obtain contact information corresponding to the character string information in the prior art is solved efficiently, and thereby the technical effect that the first electronic device can, based on character string information input by a user, obtain contact information corresponding to the character string information from a second electronic device that is connected to the first electronic device is achieved.

2. Since the first electronic device can, based on character string information input by a user, obtain contact information corresponding to the character string information from a second electronic device that is connected to the first electronic device, technical problem that the mobile phone or the computer cannot obtain the contact information needed by the user directly from other electronic devices in the prior art is solved efficiently, and thereby the technical effect that, when there is no contact information corresponding to the character string information in the first electronic device, contact information corresponding to the character string information can be obtained from other electronic devices rapidly is achieved, which improves the degree of user experience.

3. Since the technical measures of, when detecting that the user executes an application operation on the contact information (e.g., dialing, sending a short message, an email, or instant information), directly executing the operation of dialing, sending a short message, an email, or instant information corresponding to the contact information in response to the application operation are adopted, the technical problem that the mobile phone or the computer can output contact information corresponding to the character string information only when the contact information input by the user is detected by pertained devices of the mobile phone or the computer is solved effectively, and thereby the technical effect of directly responding to the user's application operation based on the contact information corresponding to the character string information, which reduces the degree of complication of user operations.

Although the preferred embodiments of the present invention have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present invention.

Obviously, those skilled in the art can make various modifications and variations to the present invention without departing from the spirit and scope thereof. Thus, if these modifications and variations of the present invention are within the scope of the claims of the invention as well as their equivalents, the present invention is also intended to include these modifications and variations.

The invention claimed is:

1. An information processing method applied to a first electronic device having a communication function and being able to be connected to a second electronic device, and the first electronic device including a display unit, the method including:
    initiating a dialing application;
    inputting first character string information used for looking up first contact information corresponding to a first contact person through a dialing interface of the dialing application;
    looking up the first contact information corresponding to the first character string in the first electronic device, and meanwhile, transmitting the first character string information to the second electronic device so as to look up the first contact information corresponding to the first character string in the first electronic device as well as the second electronic device simultaneously;
    obtaining N pieces of contact information including the first contact information which are obtained by the first electronic device and/or the second electronic device based on the first character string information, N being an integer equal to or larger than one, the contact information including mobile phone number information, the first contact information including a first mobile phone number which is obtained by the first electronic device and/or the second electronic device based on the first character string information; and
    displaying the N pieces of contact information on the display unit, so as to determine the first contact information from among the N pieces of contact information in response to a selection operation from a user when detecting the selection operation,
    when detecting that the user performs a dialing operation on the first mobile phone number through the dialing interface of the dialing application, directly executing the dialing operation corresponding to the mobile phone number information in response to the dialing operation.

2. The method according to claim 1, wherein prior to transmitting the first character string information to the second electronic device, the method further including:
    looking up whether there is the first contact information in the first electronic device based on the first character string information; and
    when there is no first contact information in the first electronic device, executing a step of transmitting the first character string information to the second electronic device.

3. The method according to claim 1, wherein transmitting the first character string information to the second electronic device further comprises:
    when detecting a transmission operation from the user, generating a transmission instruction in response to the transmission operation; and
    executing the transmission instruction to transmit the first character string information to the second electronic device.

4. The method according to claim 1, wherein the first character string information further comprises:
    name character string information corresponding to a name of the first contact person.

5. The method according to claim 1, wherein transmitting the first character string information to the second electronic device further comprises:
    transmitting the first character string information to a cloud server in a network connected to the first electronic device; and/or
    transmitting the first character string information to a handheld electronic device directly connected to the first electronic device in a wireless manner or a wired manner.

6. The method according to claim 1, wherein receiving N pieces of contact information including the first contact information which are obtained by the second electronic device based on the first character string information further comprises:
    receiving instant messaging number information including a first instant messaging number which are obtained by the second electronic device based on the first character string information; and/or
    receiving email address information including a first email address which are obtained by the second electronic device based on the first character string information.

7. The method according to claim 6, wherein after displaying the N pieces of contact information on the display unit, so as to determine the first contact information from among the N pieces of contact information in response to a selection operation from a user when detecting the selection operation, the method further including:
    when detecting that the user performs a short message sending operation on the first mobile phone number, directly executing the short message sending operation corresponding to the mobile phone number information in response to the short message sending operation; or
    when detecting that the user performs an instant information sending operation on the first instant messaging number, directly executing the instant information sending operation corresponding to the instant messaging number information in response to the instant information sending operation; or when detecting that the user performs an email sending operation on the first email address, directly executing the email sending operation corresponding to the email address in response to the email sending operation.

8. An apparatus applied to a first electronic device having a communication function and being able to be connected to a second electronic device, and the first electronic device including a display unit, the apparatus comprising:

an initiating unit for initiating a dialing application;

an obtaining unit for inputting first character string information used for looking up first contact information corresponding to a first contact person through a dialing interface of the dialing application;

a first transmitting unit for looking up the first contact information corresponding to the first character string in the first electronic device, and meanwhile, transmitting the first character string information to the second electronic device so as to look up the first contact information corresponding to the first character string in the first electronic device as well as the second electronic device simultaneously;

a receiving unit for obtaining N pieces of contact information including the first contact information which are obtained by the first electronic device and/or the second electronic device based on the first character string information, N being an integer equal to or larger than one, the contact information including mobile phone number information, the first contact information including a first mobile phone number which are obtained by the first electronic device and/or the second electronic device based on the first character string information; and a displaying unit for displaying the N pieces of contact information on the display unit, so as to determine the first contact information from among the N pieces of contact information in response to a selection operation from a user when detecting the selection operation, a first executing unit for, when detecting that the user performs a dialing operation on the first mobile phone number through the dialing interface of the dialing application, directly executing the dialing operation corresponding to the mobile phone number information in response to the dialing operation.

9. The apparatus according to claim 8, wherein the page adjusting unit further comprises a look-up unit for looking up whether there is the first contact information in the first electronic device based on the first character string information.

10. The apparatus according to claim 8, wherein the first transmitting unit further comprises:

a generating sub-unit for, when detecting a transmission operation from the user, generating a transmission instruction in response to the transmission operation; and a transmitting sub-unit for executing the transmission instruction to transmit the first character string information to the second electronic device.

11. The apparatus according to claim 8, wherein the first transmitting unit further comprises:

transmitting the first character string information to a cloud server in a network connected to the first electronic device; and/or transmitting the first character string information to a handheld electronic device directly connected to the first electronic device in a wireless manner or a wired manner.

12. The apparatus according to claim 8, wherein the receiving unit further comprises:

receiving instant messaging number information including a first instant messaging number which are obtained by the second electronic device based on the first character string information; and/or receiving email address information including a first email address which are obtained by the second electronic device based on the first character string information.

13. The apparatus according to claim 12, wherein the apparatus further comprises:

a second executing unit for, when detecting that the user performs a short message sending operation on the first mobile phone number, directly executing the short message sending operation corresponding to the mobile phone number information in response to the short message sending operation; or a third executing unit for, when detecting that the user performs an instant information sending operation on the first instant messaging number, directly executing the instant information sending operation corresponding to the instant messaging number information in response to the instant information sending operation; or a fourth executing unit for, when detecting that the user performs an email sending operation on the first email address, directly executing the email sending operation corresponding to the email address in response to the email sending operation.

* * * * *